(12) United States Patent
Jeong

(10) Patent No.: US 8,934,354 B2
(45) Date of Patent: Jan. 13, 2015

(54) RACH-SPECIFIC INFORMATION TRANSMISSION METHODS AND APPARATUSES FOR WIRELESS COMMUNICATION SYSTEM

(75) Inventor: Kyeong In Jeong, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 676 days.

(21) Appl. No.: 12/770,270

(22) Filed: Apr. 29, 2010

(65) Prior Publication Data

US 2010/0278064 A1 Nov. 4, 2010

(30) Foreign Application Priority Data

Apr. 30, 2009 (KR) .......... 10-2009-0038569

(51) Int. Cl.
| | | |
|---|---|---|
| *G01R 31/08* | (2006.01) | |
| *H04B 7/00* | (2006.01) | |
| *H04W 4/00* | (2009.01) | |
| *H04J 3/16* | (2006.01) | |
| *H04L 12/26* | (2006.01) | |
| *H04W 74/00* | (2009.01) | |
| *H04L 5/14* | (2006.01) | |
| *H04W 36/18* | (2009.01) | |
| *H04W 80/04* | (2009.01) | |
| *H04W 72/04* | (2009.01) | |
| *H04W 88/08* | (2009.01) | |
| *H04L 29/06* | (2006.01) | |
| *H04W 74/08* | (2009.01) | |

(52) U.S. Cl.
CPC .......... *H04L 43/0829* (2013.01); *H04W 74/008* (2013.01); *H04L 5/14* (2013.01); *H04L 43/50* (2013.01); *H04W 36/18* (2013.01); *H04W 80/04* (2013.01); *H04W 72/04* (2013.01); *H04W 88/08* (2013.01); *H04L 29/06163* (2013.01); *H04W 74/0833* (2013.01)

USPC .......... 370/252; 370/277; 370/328; 370/329; 370/331; 370/465

(58) Field of Classification Search
CPC ..... H04L 43/50; H04L 5/14; H04L 29/06163; H04W 80/04; H04W 72/04; H04W 88/08; H04W 84/18
USPC ...................................................... 370/252
See application file for complete search history.

(56) References Cited

U.S. PATENT DOCUMENTS

| 8,391,251 B2 | 3/2013 | Sun et al. | |
| 2009/0042582 A1* | 2/2009 | Wang et al. | ............ 455/450 |

(Continued)

FOREIGN PATENT DOCUMENTS

| CN | 1905428 | 1/2007 |
| WO | WO 2008/156315 | 12/2008 |
| WO | WO 2009/038300 | 3/2009 |

OTHER PUBLICATIONS

LG Electronics Inc., "Handling of Received UL Grant in RA Procedure", 3GPP TSG-RAN2 Meeting #63, R2-084388, Aug. 18-22, 2008.

(Continued)

*Primary Examiner* — Faruk Hamza
*Assistant Examiner* — Abu-Sayeed Haque
(74) *Attorney, Agent, or Firm* — The Farrell Law Firm, P.C.

(57) ABSTRACT

An RACH information transmission method and apparatus is provided for a wireless communication system. A preamble selected from a specific preamble group is transmitted. A random access response message having a Transmission Time Interval (TTI) bundling indicator is awaited in response to the preamble. A combined message generated by applying a TTI bundling based on the TTI bundling indicator with a number of TTIs is transmitted, when the random access response message is received.

17 Claims, 7 Drawing Sheets

(56) References Cited

U.S. PATENT DOCUMENTS

| | | | |
|---|---|---|---|
| 2010/0067412 A1* | 3/2010 | Kitazoe et al. | 370/294 |
| 2010/0074189 A1* | 3/2010 | Wang et al. | 370/329 |
| 2010/0124188 A1* | 5/2010 | Wu | 370/328 |
| 2010/0275086 A1* | 10/2010 | Bergquist et al. | 714/748 |
| 2110/0275086 * | 10/2010 | Bergquist et al. | 714/748 |
| 2010/0284376 A1* | 11/2010 | Park et al. | 370/336 |
| 2010/0331003 A1* | 12/2010 | Park et al. | 455/450 |
| 2011/0019655 A1* | 1/2011 | Hakola | 370/342 |
| 2011/0032889 A1* | 2/2011 | Lee et al. | 370/329 |

OTHER PUBLICATIONS

Ericsson, "On Uplink Coverage for LTE", TSG-RAN WG1 #52, R1-080865, Feb. 11-15, 2008.

3rd Generation Partnership Project; Technical Specification Group Radio Access Network; Evolved Universal Terrestrial Radio Access (E-UTRA).

Medium Access Control (MAC) Protocol Specification (Release 8), 3GPP TS 36.321 V8.5.0, Mar. 23, 2009.

* cited by examiner

RACH-SPECIFIC INFORMATION TRANSMISSION METHODS AND APPARATUSES FOR WIRELESS COMMUNICATION SYSTEM

PRIORITY

This application claims priority under 35 U.S.C. 119(a) to an application filed in the Korean Intellectual Property Office on Apr. 30, 2009, and assigned Serial No. 10-2009-0038569, the contents of which are incorporated herein by reference.

BACKGROUND OF THE INVENTION

1. Field of the Invention

The present invention relates generally to wireless communications and, in particular, to a Random Access CHannel (RACH) information transmission method and apparatus in a wireless communication system.

2. Description of the Related Art

Long Term Evolution (LTE) is a successor to the $3^{rd}$ Generation (3G) network technologies of the Universal Mobile Telecommunication Service (UMTS) standard, and supports high-speed packet services based on Orthogonal Frequency Division Multiplexing (OFDM).

Referring initially to FIG. 1, a diagram illustrates an LTE system architecture.

LTE mobile communication is characterized by Evolved Radio Access Networks (E-RANs) 110 and 112 having only two types of infrastructure nodes: Evolved Node B's (ENBs) 120, 122, 124, 126, and 128 and anchor nodes 130 and 132. A User Equipment (UE) 101 accesses an Internet Protocol (IP) network 114 via E-RANs 110 and 112. The ENBs 120, 122, 124, 126, and 128 are responsible for wireless channel establishment for the UE 101 and management of the cells and wireless resources. For example, the ENBs 120, 122, 124, 126, and 128 broadcast system information, allocate a radio resource for transmission of data and control information to the UE 101, and determine a handover of the UE 101 based on channel management information collected from a current cell and its neighbor cells. The ENBs 120, 122, 124, 126, and 128 are provided with a control protocol such as a Radio Resource Control (RRC) related to the radio resource management.

FIG. 2 is a diagram illustrating RACH signaling between a UE and an ENB in a conventional LTE system.

In FIG. 2, a UE 201 attempts random access to an ENB 203. The ENB 203 broadcasts system information including information on parameters specific to random access in step 211. The system information includes information on ranges of IDs of Random Access Preamble group A and Random Access Preamble group B, a transmission message size threshold of the UE 201 (THRES), and a channel condition offset (OFFSET). These parameters are specified in the 3GPP standard TS36.331v850. The information on the range of IDs of preambles in Random Access Preamble group A is informed by sizeOFRA-PreamblesGroupA. The information on the range of IDs of preambles in Random Access Preamble group B is obtained by numberOF-Preambles (total number of preambles for contention-based Random Access)-sizeOFRA-PreamblesGroupA. MessageSizeGroupA is an offset indicating a channel condition. When a pathloss is less than $P_{CMAX}$-preambleInitialReceivedTargetPower-deltaPreambleMsg3-messagePowerOffsetGroupB (i.e., the channel condition is good) and the transmission size is greater than messageSizeGroupA, the UE selects a preamble in the Preamble Group A. In other cases, the UE selects a preamble in Preamble Group B. The parameters $P_{CMAX}$, preambleInitialReceivedTargetPower, and deltaPreambleMsg3 are specified in 3GPP standard TS36.331v850.

Once the preamble group and a preamble are selected, the UE 201 sends the selected random access preamble to the ENB 203 on a RACH in step 221. If the random access preamble is received successfully, the ENB 203 sends a random access response message containing information on the preamble ID and Timing Advance (TA) for adjusting the uplink timing in step 231. Upon receipt of the random access response message, the UE sends a scheduled transmission message containing information on the uplink resource allocation for message transmission and Temporary-Radio Network Temporary Identifier (T-RNTI) to the ENB 203 in step 241.

If more than one UE used the same random access preamble simultaneously at step 221, they are likely to collide with each other. In order to make clear which UE has succeeded in transmitting the preamble, the ENB 203 sends a contention resolution message containing information on the Serving-Temporary Mobile Subscriber Identity (S-TMSI) received at step 241 or a Random number to the UE in step 251. Each of UEs that used the same preamble receives the contention resolution message and checks whether the S-TMSI or Random number matches that which it transmitted at step 241. If the ID information matches, the UE continues the random access procedure and, otherwise, reinitiates the random access procedure.

In the LTE system, the size of the message transmitted by the UE 201 at step 241 of FIG. 2 is limited. Thus, the UE transitioning from an idle mode to a connected mode can transmit only an RRC Connection REQ message at step 241 and a Non Access Stratum (NAS) Service Request (REQ) message after step 251. Since the RRC Connection REQ message and the NAS Service REQ message are transmitted in stepwise manner, this causes the procedural delay. The RRC Connection REQ message and the NAS Service Request message are defined in the 3GPP standards TS36.331v850 and TS24.301v810, respectively.

SUMMARY OF THE INVENTION

The present invention has been made to address at least the above problems and/or disadvantages and to provide at least the advantages described below. Accordingly, an aspect of the present invention provides an RACH-specific information transmission method and apparatus that is capable of reducing the procedural delay by transmitting the RRC Connection REQ message and NAS Service REQ message simultaneously rather than in stepwise manner.

According to one aspect of the present invention, a method for optimizing a random access procedure of a user equipment in a wireless communication system is provided. A preamble selected from a specific preamble group is transmitted. A random access response message having a Transmission Time Interval (TTI) bundling indicator is awaited in response to the preamble. When the random access response message is received, a combined message generated by applying a TTI bundling based on the TTI bundling indicator with a number of TTIs is transmitted.

According to another aspect of the present invention, a method is provided for processing RACH information in a wireless communication system. System information including a preamble identity (ID) range of a specific preamble group and a channel offset are broadcasted from an ENB. A currently measured pathloss is compared with a configuration value at a UE. When a channel condition is bad based on the comparison result, when the UE is a Long Term Evolution-Advanced (LTE-A) terminal, and when the UE is in an idle mode, a preamble selected from the specific preamble group is transmitted from the UE to the ENB. When the ENB receives the preamble, an RACH response message having a TTI bundling indicator is transmitted from the ENB to the UE. When the UE receives the RACH response message, a combined message generated by applying a TTI bundling based on the TTI bundling indicator with a number of TTIs is transmitted from the UE to the ENB. The combined message is processed at the ENB.

According to an additional aspect of the present invention, a RACH information processing apparatus for a user equipment communicating with an ENB in a wireless communication system is provided. The apparatus includes a type determiner that determines if the user equipment is a LTE-A terminal. The apparatus also includes a mode detector that detects whether the user equipment is in an idle mode. The apparatus additionally includes a measurement unit that measures a pathloss, compares the measured pathloss with a configuration value, and analyzes a channel condition based on the comparison result. The apparatus further includes a preamble selector which receives outputs of the type determiner, the mode detector, and the measurement unit, selects a preamble from a specific preamble group when the pathloss is greater than the configuration value, when the user equipment is the LTE-A terminal, and when the user equipment is in an idle mode, and transmits the selected preamble. The apparatus also includes a message analyzer that analyzes an RACH response message received in response to the preamble to determine whether the RACH response includes a TTI bundling indicator. The apparatus further includes a message generator that generates a combined message by applying TTI bundling, when the RACH response includes a TTI bundling indicator. Additionally, the apparatus includes a transceiver that receives the system information and RACH response transmitted by the ENB, and transmits the preamble selected from the specific preamble group and the combined message to the ENB with the TTI bundling.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
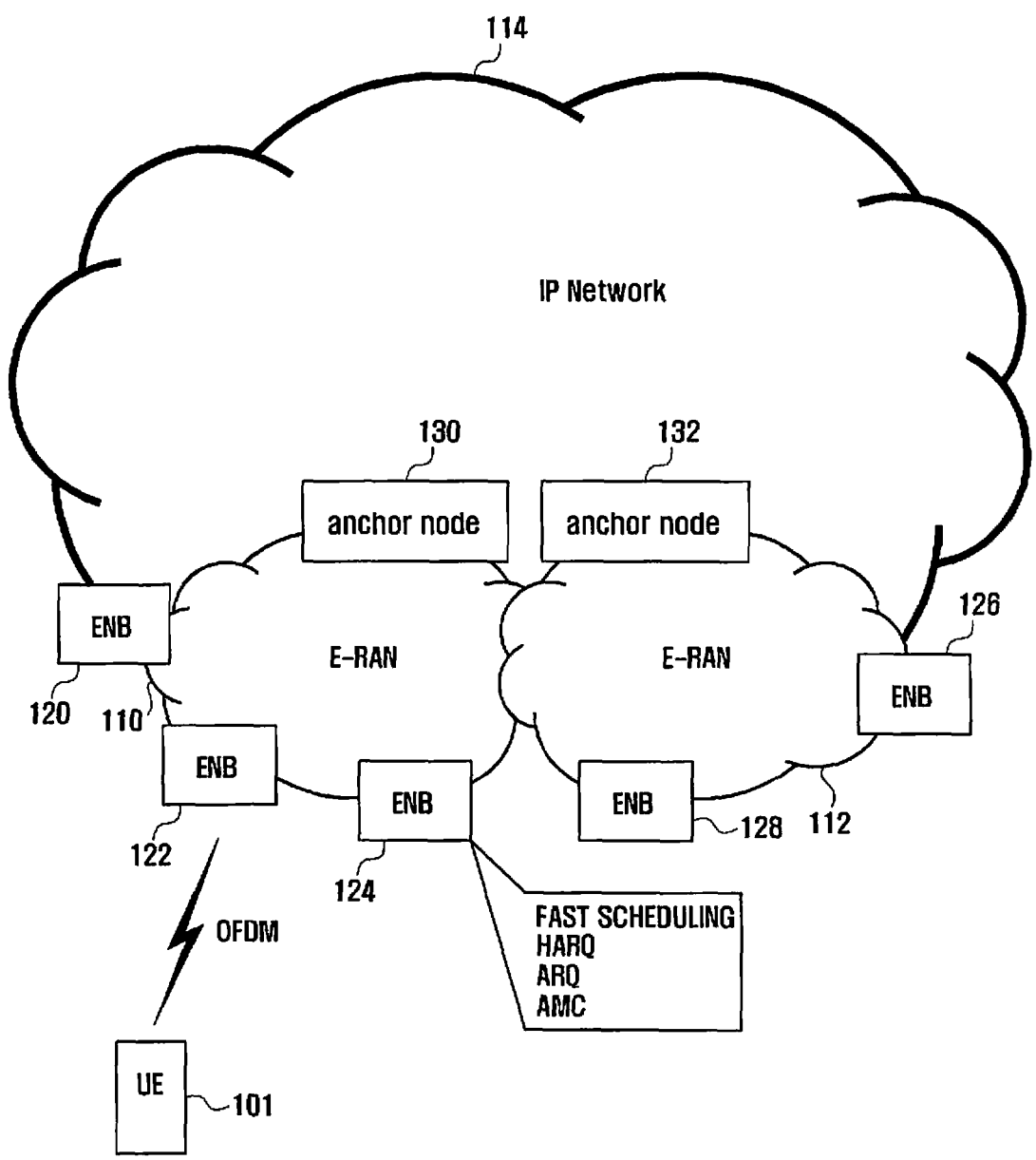
FIG. 1 is a diagram illustrating an LTE system architecture.
Figure 2:
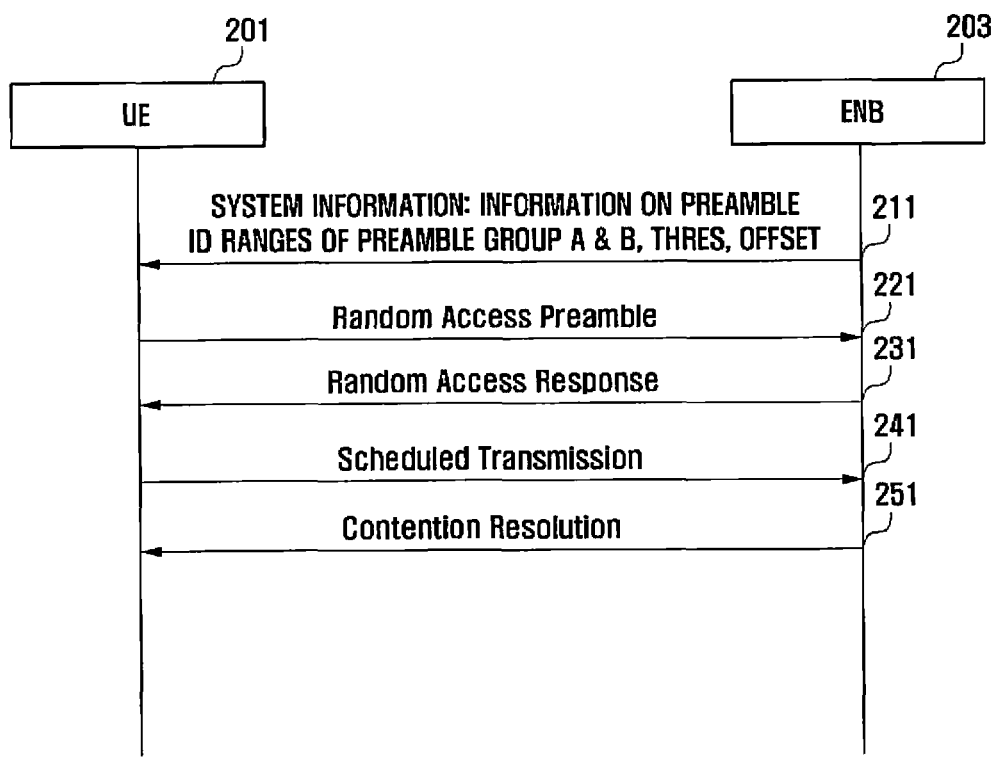
FIG. 2 is a signaling diagram illustrating RACH signaling between a UE and an ENB in a conventional LTE system.

Embodiments of the present invention are described in detail with reference to the accompanying drawings in detail. The same or similar reference numbers are used throughout the drawings to refer to the same or similar components. Detailed descriptions of constructions or processes known in the art may be omitted to avoid obscuring the subject matter of the present invention.

In the wireless communication systems of embodiments of the present invention, the UE sends an RRC Connection REQ message and an NAS Service REQ message to the network simultaneously when transmitting RACH information so as to reduce the mode transition delay.

In order to achieve this purpose, the UE transmits an RACH message using a TTI Bundling technique. For this purpose, a new preamble group C is defined, and information on the preamble ID range of the preamble group C and a channel offset value for selecting the preamble group C is broadcasted in the system information. TTI bundling is a technique to transmit a same transport block using consecutive resources in a time domain. The newly introduced preamble group C is a preamble group with which a UE can transmit an RRC Connection REQ message and a NAS Service REQ message simultaneously in an RACH message using the TTI bundling. In the following description, the term "preamble group C" is used interchangeably with the term "specific preamble group".

With the preamble group A and the preamble group B that are currently defined in the specification, the UE sends a preamble selected in the preamble group B when the pathloss is less than a threshold value and the transmission data is greater than a threshold value (pathloss<threshold and transmission data>threshold). Otherwise, the UE sends a preamble selected in the preamble group A. In embodiments of the present invention, the preamble group C is defined as the preamble group used for the UE to request an ENB for transmission of data using TTI bundling.

In an embodiment of the present invention, the UE supports TTI bundling with the preamble group C (e.g., LTE-A UE) and it is assumed that TTI bundling is used when the channel condition is bad (i.e., the pathloss is greater than a configuration value set with the channel offset) and the UE is in an idle mode. The pathloss can be greater than $P_{CMAX}$-preambleInitialReceivedTargetPower-deltaPreambleMsg3-channel offset value. Here, the $P_{CMAX}$ can be selected as the least value of the maximum UE transmission power and the maximum available transmission power within a cell. The preambleInitialReceivedTargetPower can be an open loop power control compensation value. The deltaPreambleMsg3 can be a compensation value of the preamble format to be used. The $P_{CMAX}$, preambleInitialReceivedTargetPower, and deltaPreambleMsg3 can be broadcasted in the system information.

As described above, if the UE is an LTE-A UE, if the current channel condition is bad, and if the UE is in an idle mode, the UE can use the preamble group C. The definition of the idle mode follows the RRC_IDLE state specified in the 3GPP standard TS36.331v850. A UE fulfilling the three conditions selects a preamble in the preamble group C. The ENB receiving the preamble in the preamble group C allocates a radio resource for RACH message transmission with TTI bundling.

If the TTI bundling applies, the ENB sends the UE an RACH message containing an indicator informing of the application of TTI bundling and a number of TTIs for TTI bundling. The information on the number of consecutive TTIs for TTI bundling can be transmitted as the system information. If the UE sends a preamble of the preamble group C, the ENB can send a message having only the TTI bundling indicator. If the RACH response message is received, the UE transmits a combined RACH message (here, the combined message includes the RRC Connection REQ message and the NAS Service REQ message) using the resource consecutively allocated in a time domain. The UE combines and transmits the RRC Connection REQ message and the NAS Service REQ message simultaneously as a single message. If the combined RACH message (i.e., the RRC Connection REQ and NAS Service REQ) is received, the ENB separates the RRC Connection REQ and NAS Service REQ message from the combined RACH message, and transfers the separated messages to an upper core node, or Mobility Management Entity (MME). The definition of MME follows the 3GPP standard TS23.401.

Although it is described above that the information on whether to apply TTI bundling and a number of the consecutive TTIs are signaled using the RACH response message, the use of TTI bundling and a predetermined number of consecutive TTIs can be implicitly acknowledged by the UE when the UE sends the preamble selected in the preamble group C.

Figure 3:
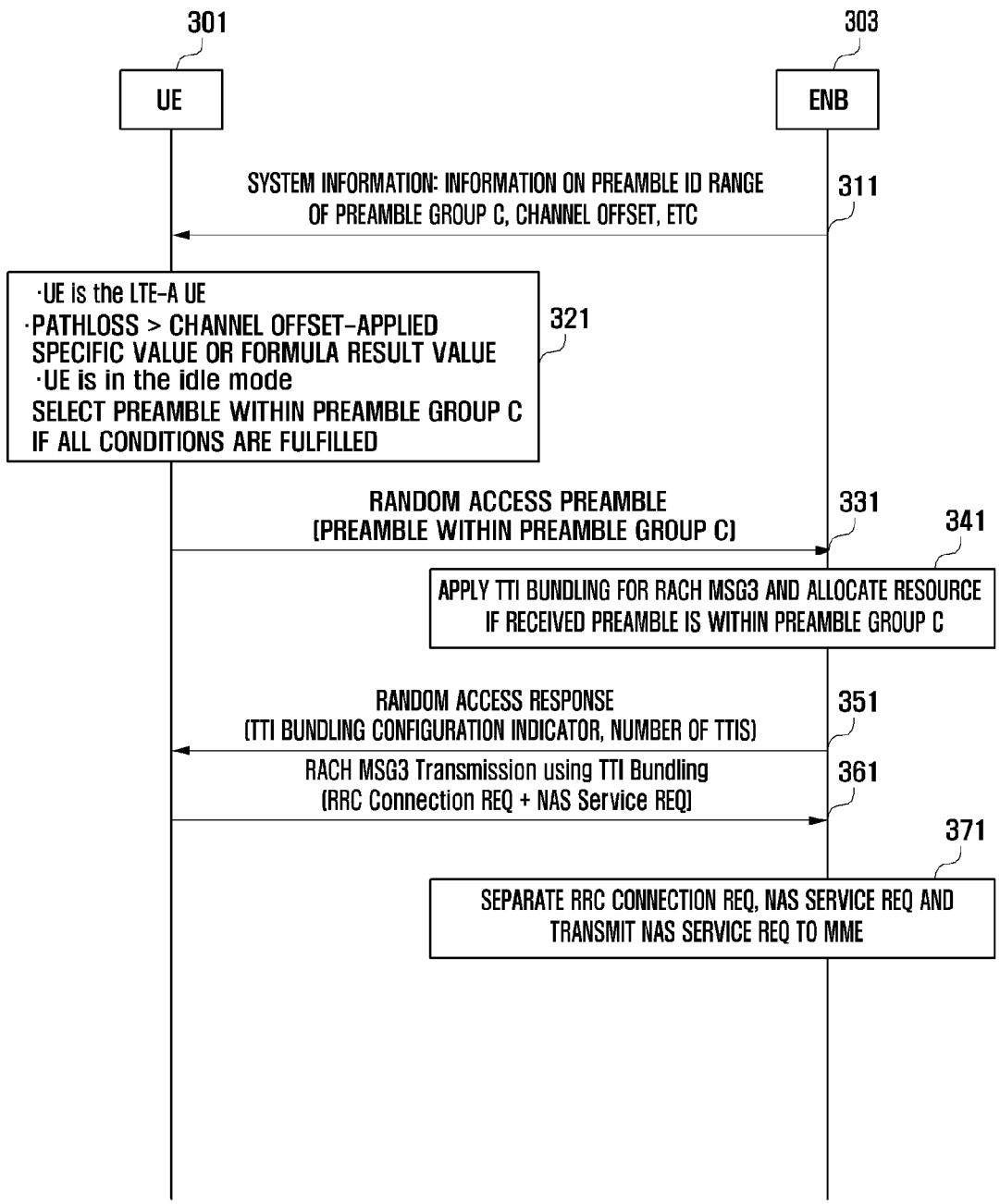
FIG. 3 is a sequence diagram illustrating operations of a UE and an ENB for supporting an RACH procedure in a wireless communication system, according to an embodiment of the present invention.

FIG. 3 is a sequence diagram illustrating operations of a UE and an ENB for supporting an RACH procedure in a wireless communication system, according to an embodiment of the present invention.

An ENB 303 defines preamble group C and broadcasts the system information containing the information on the ID range of the preambles in the preamble group C and the channel offset value for selecting the preamble group C in step 311. The system information includes the preamble ID ranges of the preamble group C and information containing $P_{CMAX}$, preambleInitialReceivedTargetPower, deltaPreambleMsg3, and channel offset required for measuring pathloss of a UE. The system information can include the number of consecutive TTIs for TTI bundling.

A UE 301 checks the channel condition and operation mode upon receipt of the system information and determines whether to use a preamble of the preamble group C in step 321. If the UE 301 is an LTE-A UE, if the pathloss is greater than a value obtained by a formula as the right term of Equation (1) (i.e., channel state is bad), and if the UE 301 is in an idle mode, it selects a preamble from the preamble group C. If the three conditions (UE=LTE-A UE, pathloss>PCMAX-preambleInitialReceivedTargetPower-deltaPreambleMsg3-channel offset, and UE operation mode=idle mode) are fulfilled, the UE selects a preamble from the newly introduced preamble group C.

$$\text{PATHLOSS>PCMAX-preambleInitialReceivedTargetPower-deltaPreambleMsg3-channel offset} \quad (1)$$

If the three conditions are fulfilled, the UE 301 sends a preamble selected from the preamble group C to the ENB 303 using a Physical Random Access (PRACH) resource signaled by the ENB 303 in step 331. If the preamble selected from the preamble group C is received, the ENB 303 applies TTI bundling for transmitting an RACH message (RACH MSG3) and allocates a radio resource for the RACH MSG3 in step 341. Once the TTI bundling for the RACH MSG3 has been determined, the ENB 303 sends a Random Access Response message containing the TTI bundling configuration indicator and a number of consecutive TTIs for the TTI bundling to the UE 301 in step 351. The number of TTIs for the TTI bundling can be carried in the system information. The Random Access Response message can be transmitted without the information on the number of TTIs at step 351.

If the Random Access Response message is received, the UE 301 generates a combined RACH message in consideration of the number of TTIs, and sends the combined RACH message to the ENB 303 using the resource allocated for the RACH message (RACH MSG3) in step 361. The combined RACH message can be a plurality of RACH messages combined according to the TTI bundling configuration. The combined RACH messages can be the RRC Connection REQ message and the NAS Service REQ message. Thus, the RRC Connection REQ message and the NAS Service REQ message are transmitted simultaneously in the form of a combined RACH MSG3.

If the combined RACH MSG3 is received, the ENB 303 decomposes the combined RACH MSG3 into the RRC Connection REQ message and the NAS Service REQ message, and transfers the NAS Service REQ message to a core network node, i.e., the MME, in step 371.

While a determination of whether to use TTI bundling and the number of consecutive TTIs for TTI bundling is signaled to the UE explicitly, the UE can configure TTI bundling with a predetermined number of consecutive TTIs autonomously when it has transmitted the preamble selected from the preamble group C.

Figure 4:
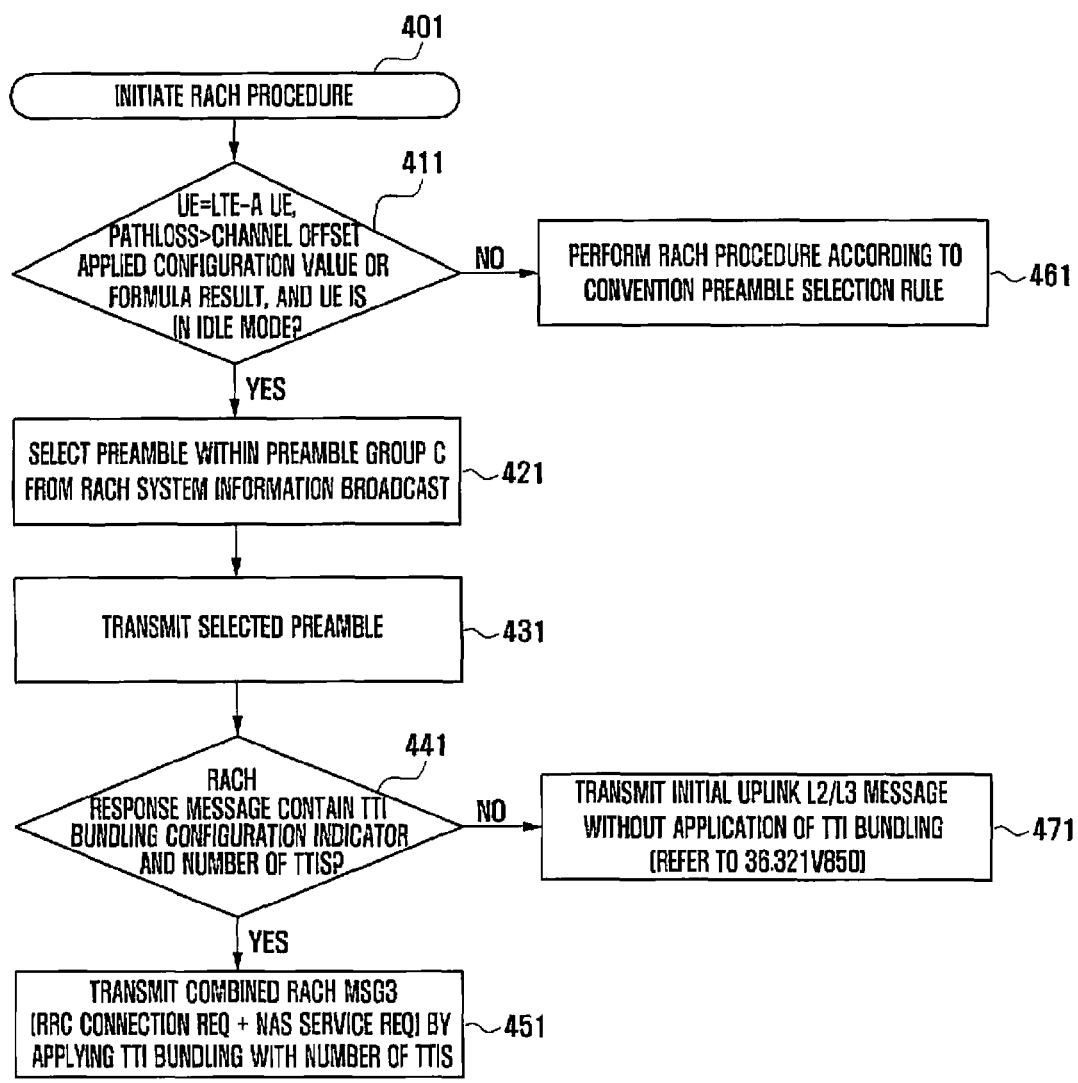
FIG. 4 is a flowchart illustrating steps of the RACH procedure performed in the UE of FIG. 3, according to an embodiment of the present invention.

FIG. 4 is a flowchart illustrating steps of the RACH procedure performed in the UE of FIG. 3, according to an embodiment of the present invention.

Once the RACH procedure is initiated in step 401, the UE 301 determines whether to uses a preamble from the preamble group C in step 411. The UE 301 determines if the UE 301 is an LTE-A terminal, if the measured pathloss is greater than a specific value to which a channel offset is applied, and if the UE is in an idle mode at step 411. If the three conditions (UE=LTE-A UE, pathloss>PCMAX-preambleInitialReceivedTargetPower-deltaPreambleMsg3-channel offset, and UE operation mode=idle mode) are fulfilled, the UE 301 selects a preamble from the newly introduced preamble group C in step 421. Once a preamble is selected from the preamble group C, the UE transmits the selected preamble to the ENB 303 in step 431. If at least one of the three condition is not fulfilled at step 411, the UE 301 continues the RACH procedure according to the conventional preamble selection rule, by selecting one of preamble group A and preamble group B and selecting a preamble from the selected preamble group, as specified in the 3GPP standard TS36.321v850.

After the transmission of the preamble in step 431, the UE 301 waits to receive a random access response message. The random access response message can include the TTI bundling configuration indicator and the number of TTIs. Once the random access response message is received, the UE 301 determines whether the random access response message contains the TTI bundling configuration indicator and the number of TTIs in step 411. If the random access response message contains the TTI bundling configuration indicator and the number of TTIs, the UE 301 generates and transmits a combined RACH message to the ENB 303 using the resource consecutive in a time domain according to the number of TTIs in step 451. The combined RACH message can include the RRC Connection REQ message and The NAS Service REQ message, and is referred to as Combined RACH MSG3.

If it has been determined that the random access response message does not include the TTI bundling configuration indicator and the number of TTIs in step 441, the UE 301 performs the RACH procedure according to the convention preamble selection rule specified in the 3GPP standard TS36.321v850 in step 471.

Figure 5:
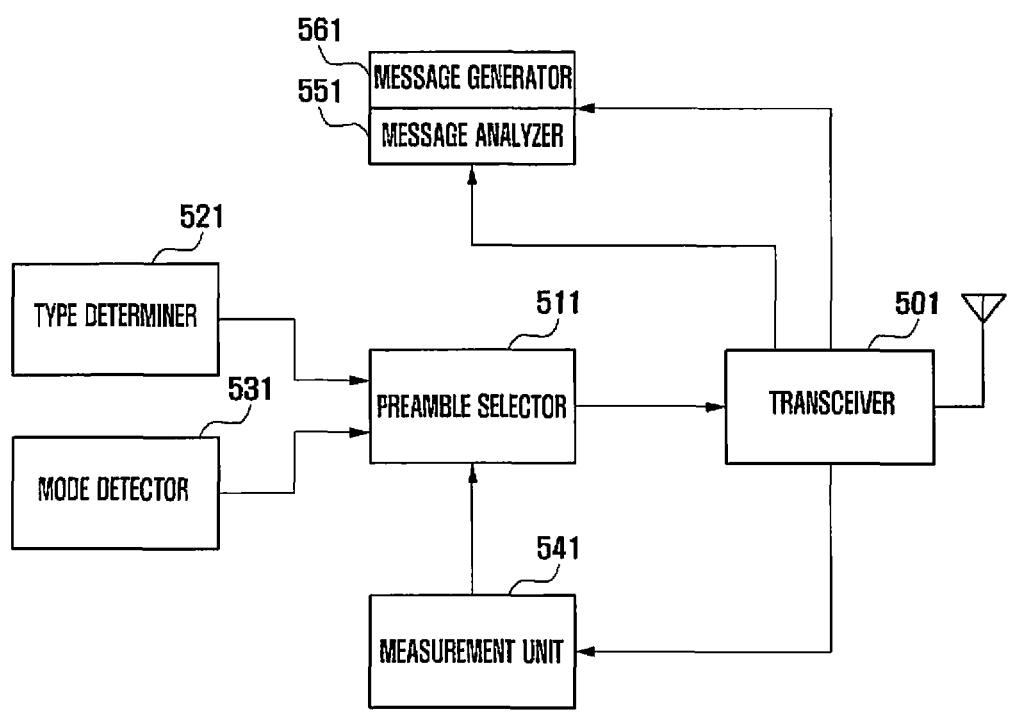
FIG. 5 is a block diagram illustrating a configuration of the UE for performing the RACH procedure of FIG. 4, according to an embodiment of the present invention.

Referring now to FIG. 5, a block diagram illustrates a configuration of the UE 301 for performing the RACH procedure of FIG. 4, according to an embodiment of the present invention.

As shown in FIG. 5, the UE 301 includes a transceiver 501, a preamble selector 511, a type determiner 521, a mode detector 531, a measurement unit 541, a message analyzer 551, and a message generator 561.

The transceiver 501 is responsible for establishing a communication link with an ENB. The transceiver 501 can include a Radio Frequency (RF) unit and a modem. The transceiver 501 receives the system information, including the preamble ID range and channel offset, and the random access response message, including the TTI bundling configuration indicator and the number of TTIs, which are transmitted by the ENB 303. The transceiver 501 transmits the preamble and the RACH MSG3 to the ENB 303.

The type determiner 521 determines the type of the UE 301 (e.g., LTE-A). The mode detector 531 detects the current operation mode of the UE 301. The UE 301 can operate in an idle mode or a busy mode. The measurement unit 541 measures a pathloss of the signal received by the transceiver 501 and determines the current channel condition based on the measurement result. Specifically, the measurement unit 541 measures the pathloss and determines whether the measured pathloss is greater than a value configured by applying the channel offset value as shown in Equation (1) above. The parameters ($P_{CMAX}$, preambleInitialReceivedTargetPower, deltaPreambleMsg3, and channel offset) in Equation (1) can be carried in the system information transmitted by the ENB 303.

The preamble selector 511 can include or generate the preamble groups A, B, and C. The preamble selector 511 receives the outputs of the type determiner 521, the mode detector 531, and the management unit 531, select one of the preamble groups based on the UE 301 conditions, and selects a preamble from the selected preamble group. In an embodiment of the present invention, if the UE 301 is an LTE-A terminal, if the UE 301 operates in an idle mode, and if the measured pathloss is greater than a configuration value obtained by applying the channel offset (i.e., if Equation (1) is satisfied), the preamble selector 511 selects a preamble from the preamble group C. The preamble selected by the preamble selector 511 is transmitted to the ENB 303 by means of the transceiver 501.

The message analyzer 551 analyzes the messages received through the transceiver 501. The received message can be a random access response message, containing a TTI bundling configuration indicator and a number of TTIs, that is transmitted by the ENB 303. The information on the number of TTIs can be carried in the system information transmitted by the ENB 303. The message generator 561 can generate an initial uplink L2/L3 message according to the information on the TTI bundling configuration information and the number of TTIs, and transmit the uplink L2/L3 message in the form of a combined message according to the TTI bundling. The initial uplink L2/L3 message can include the RRC Connection REQ message and the NAS Service REQ message. The message combined according to the TTI bundling can be transmitted to the ENB 303 by means of the transceiver 501.

The transceiver 501 establishes a radio link with the ENB 303 and receives the information on the preamble ID range of the newly introduced preamble group C and the channel offset that is transmitted by the ENB 303. The measurement unit 541 measures the pathloss/channel condition with the application of the channel offset, the mode manager 531 determines whether the UE 301 operates in an idle mode, the type determiner 521 determines the type of the UE 301, and the preamble selector 511 selects one of the preamble groups based on the measurement and determination results and a preamble from the selected preamble group. If the random access response message received in response to the preamble includes the TTI bundling configuration indicator, the message analyzer/generator 551 and 561 generates the initial uplink L2/L3 message containing the RRC Connection REQ message and NAS Service REQ message and transmits the initial uplink L2/L3 message using the TTI bundling.

Figure 6:
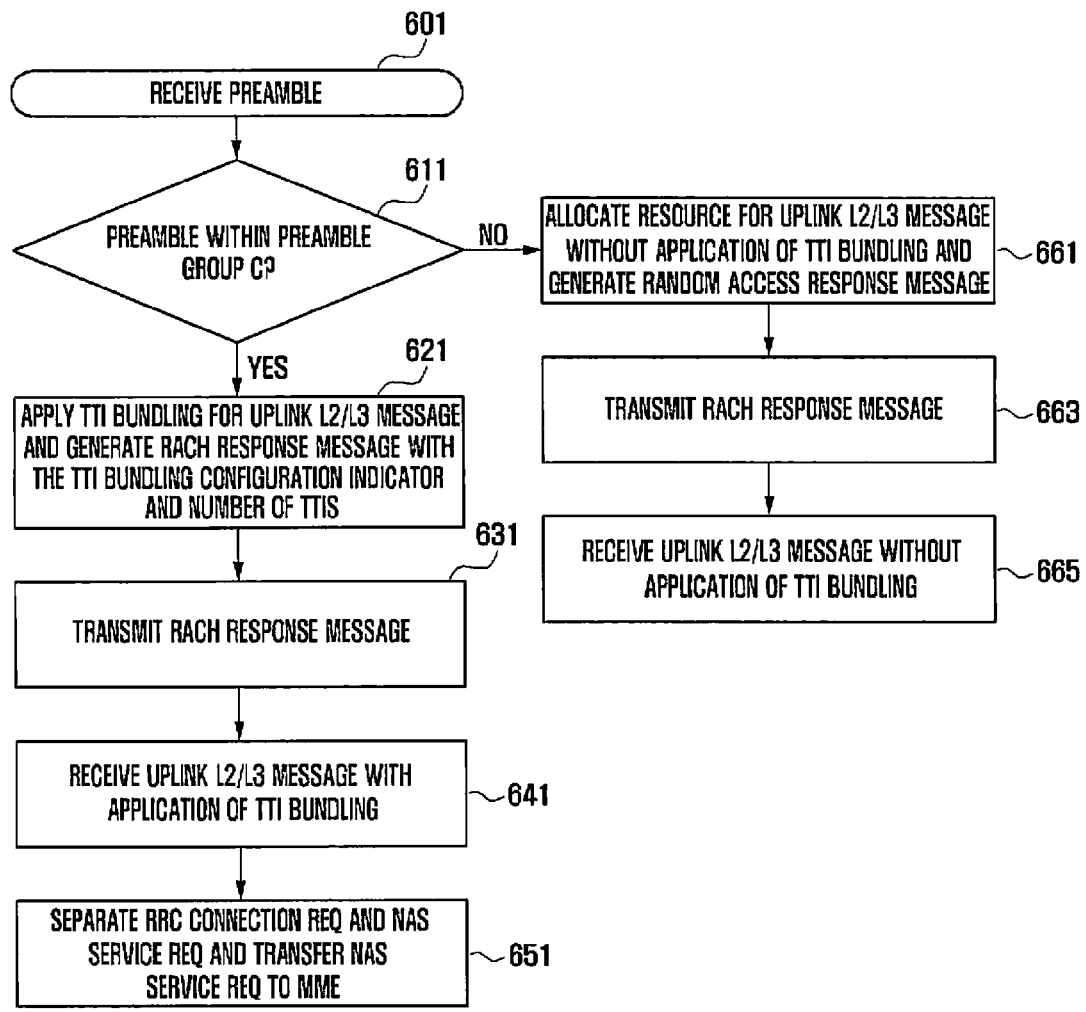
FIG. 6 is a flowchart illustrating steps of the RACH procedure performed in the ENB of FIG. 3, according to an embodiment of the present invention.

FIG. 6 is a flowchart illustrating steps of the RACH procedure performed in the ENB of FIG. 3, according to an embodiment of the present invention.

Referring to FIG. 6, the ENB 303 first receives a preamble transmitted by the UE 301 in step 601. Once the preamble is received, the ENB 303 determines whether the preamble belongs to the preamble group C in step 611. If the preamble belongs to the preamble group C, the ENB 303 applies TTI bundling for transmission of the uplink L2/L3 message, allocates a radio resource for the uplink L2/L3 message, and generates a random access response message with a TTI bundling configuration indicator and a number of the TTIs in step 621. The ENB 303 transmits the random access response message to the UE 301 in step 631.

After transmitting the random access response message, the ENB 303 waits to receive the uplink L2/L3 message (RACH MSG3 combining the RRC Connection REQ and NAS Service REQ messages) transmitted by the UE 301 in accordance with the TTI bundling. If the TTI bundling-based uplink L2/L3 message is received in step 641, the ENB 303 decomposes the RRC Connection REQ message and the NAS Service REQ message from the uplink L2/L3 message and transfers the NAS Service REQ message to the MME in step 651.

If the preamble does not belong to the preamble group C at step 611, the ENB 303 allocates the resource for the uplink L2/L3 message without application of TTI bundling and generates a random access response message in step 661. The random access response message can include the TTI bundling configuration indicator set to "FALSE" and the number of TTIs set to "1". The ENB 303 transmits the random access response message to the UE 301 in step 663 and receives the uplink L2/L3 message transmitted by the UE 301 without application of TTI bundling in step 665.

Figure 7:
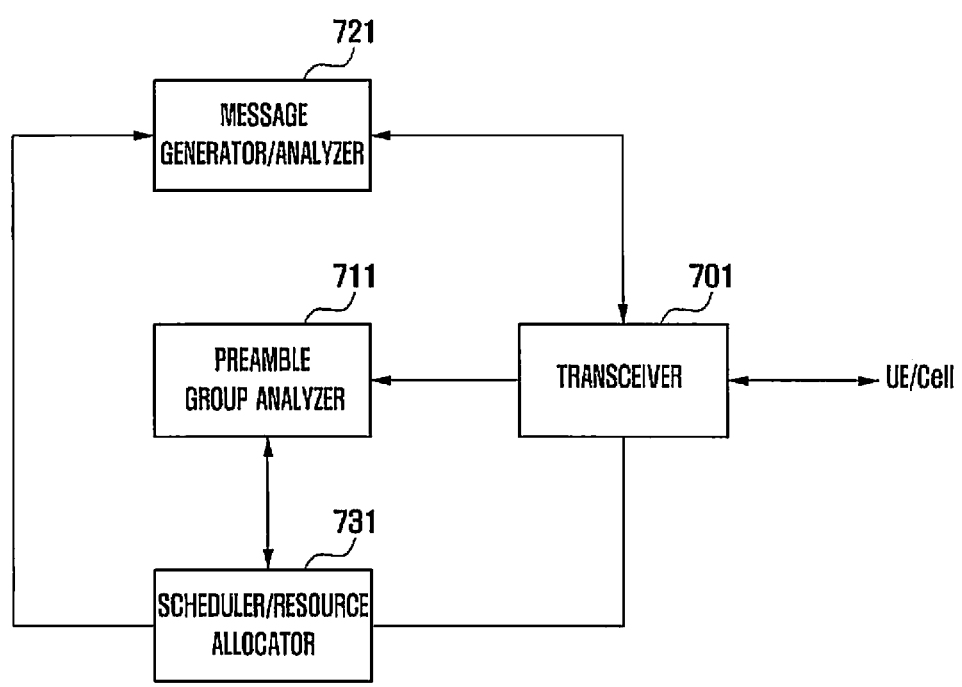
FIG. 7 is a block diagram illustrating a configuration of the ENB for performing the RACH procedure of FIG. 6, according to an embodiment of the present invention.

FIG. 7 is a block diagram illustrating a configuration of the ENB for performing the RACH procedure of FIG. 6, according to an embodiment of the present invention.

As shown in FIG. 7, the ENB includes a transceiver 701, a preamble group analyzer 711, a message generator/analyzer 721, and a scheduler/resource allocator 731.

The transceiver 701 is responsible for establishing a radio link with the UE 301. The transceiver 701 transmits the system information and the random access response message with the resource allocation information, and receives the preamble and TTI-bundled uplink L2/L3 message transmitted by the UE 301. The preamble group analyzer 711 analyzes the preamble received by the transceiver 701 to determine whether the preamble belongs to the preamble group C. In the embodiment of FIG. 7, it is assumed that the received preamble belongs to the preamble group C. The scheduler/resource allocator 731 allocates a resource depending on the preamble group to which the received preamble belongs. The resource can be TTI bundling resource or non-TTI bundling resource. If the received preamble belongs to the preamble group C, the scheduler/resource allocator 731 allocates the TTI bundling resource to the UE. When TTI bundling is applied, the message generator/analyzer 721 decomposes the uplink L2/L3 message transmitted by the UE 301 into the RRC Connection REQ message and the NAS Service REQ message and transfers the NAS Service REQ message to the MME.

As described above, the RACH-specific information transmission methods and apparatuses of the present invention allows the UE to transmit the RRC Connection REQ and the NAS Service REQ message simultaneously with the RACH information in response to the random access response message. This results in a reduction in procedural delay caused by stepwise transmission of the RRC Connection REQ and the NAS Service REQ message.

Although the invention has been shown and described with reference to certain embodiments thereof, it will be understood by those skilled in the art that various changes in form and detail may be made therein without departing from the spirit and scope of the present invention as defined by the appended claims.

What is claimed is:

1. A method for optimizing a random access procedure of a user equipment in a wireless communication system, comprising the steps of:
    transmitting a preamble selected from a specific preamble group of a plurality of preamble groups; and
    transmitting a combined message generated by combining a plurality of Random Access CHannel (RACH) messages according to a Transmission Time Interval (TTI) bundling configuration, based on a TTI bundling indicator with a number of TTIs, when the random access response message having the TTI bundling indicator is received in response to the preamble,
    wherein the specific preamble group comprises at least one preamble indicating that the user equipment transmits the combined message generated by applying the TTI bundling.

2. The method of claim 1, further comprising:
    receiving system information including a preamble identity range of the specific preamble group and a channel offset;
    comparing a currently measured pathloss with a configuration value;
    selecting a preamble from the specific preamble group, when a channel condition is bad based on the comparison result, when the user equipment is a Long Term Evolution-Advanced (LTE-A) terminal, and when the user equipment is in an idle mode.

3. The method of claim 2, wherein the currently measured pathloss is compared with the configuration value in accordance with the following equation:

PATHLOSS>PCMAX-preambleInitialReceivedTargetPower-deltaPreambleMsg3-channel offset where PCMAX is a smallest value of a maximum user equipment transmission power and a maximum available transmission power within a cell,
preambleInitialReceivedTargetPower is an open loop power control compensation value, and deltaPreambleMsg3 is a compensation value of a preamble format to be used, and the PCMAX, preambleInitialReceivedTargetPower, and deltaPreambleMsg3 are broadcasted in the system information.

4. The method of claim 2, wherein the combined message comprises a Radio Resource Control Connection Request (RRC Connection REQ) message and a Non Access Stratum Service Request (NAS Service REQ) message.

5. The method of claim 4, wherein the number of TTIs is carried by the system information.

6. The method of claim 4, wherein the number of TTIs is carried by the random access response message.

7. A method for processing Random Access Channel (RACH) information in a wireless communication system, comprising the steps of:
    broadcasting, from an Evolved Node B (ENB), system information including a preamble identity (ID) range of a specific preamble group and a channel offset;
    comparing, at a User Equipment (UE), a currently measured pathloss with a configuration value;
    transmitting a preamble selected from the specific preamble group of a plurality of preamble groups from the UE to the ENB, when a channel condition is bad based on the comparison result, when the UE is a Long Term Evolution-Advanced (LTE-A) terminal, and when the UE is in an idle mode;
    transmitting an RACH response message having a Transmission Time Interval (TTI) bundling indicator from the ENB to the UE, when the ENB receives the preamble;
    transmitting a combined message generated by combining a plurality of RACH messages according to a TTI bundling configuration, based on the TTI bundling indicator with a number of TTIs from the UE to the ENB, when the UE receives the RACH response message; and
    processing, at the ENB, the combined message,
    wherein the specific preamble group comprises at least one preamble indicating that the user equipment transmits the combined message generated by applying the TTI bundling.

8. The method of claim 7, wherein the currently measured pathloss is compared with the configuration value in accordance with the following equation:

PATHLOSS>PCMAX-preambleInitialReceivedTargetPower-deltaPreambleMsg3-channel offset where PCMAX is a smallest value of a maximum user equipment transmission power and a maximum available transmission power within a cell,
preambleInitialReceivedTargetPower is an open loop power control compensation value, and deltaPreambleMsg3 is a compensation value of a preamble format to be used, and the PCMAX, preambleInitialReceivedTargetPower, and deltaPreambleMsg3 are broadcasted in the system information.

9. The method of claim 8, wherein the combined message comprises a Radio Resource Control Connection Request (RRC Connection REQ) message and a Non Access Stratum Service Request (NAS Service REQ) message.

10. The method of claim 9, wherein processing the combined message comprises:
    separating the RRC Connection REQ message and the NAS Service REQ message from the combined message; and
    transferring the NAS Service REQ message to a Mobility Management Entity (MME).

11. The method of claim 9, wherein the number of TTIs is carried by the system information.

12. The method of claim 9, wherein the number of TTIs is carried by the RACH response message.

13. A Random Access Channel (RACH) information processing apparatus for a user equipment communicating with an evolved Node B (ENB) in a wireless communication system, comprising:
    a type determiner that determines if the user equipment is a Long Term Evolution-Advanced (LTE-A) terminal;
    a mode detector that detects whether the user equipment is in an idle mode;

a measurement unit that measures a pathloss, compares the measured pathloss with a configuration value, and analyzes a channel condition based on the comparison result;

a preamble selector that receives outputs of the type determiner, the mode detector, and the measurement unit, selects a preamble from a specific preamble group of a plurality of preamble groups when the pathloss is greater than the configuration value, when the user equipment is the LTE-A terminal, and when the user equipment is in the idle mode, and transmits the selected preamble;

a message analyzer that analyzes an RACH response message received in response to the preamble to determine whether the RACH response message includes a Transmission Time Interval (TTI) bundling indicator;

a message generator that generates a combined message by combining a plurality of RACH messages according to a TTI bundling configuration, when the RACH response includes the TTI bundling indicator; and a transceiver that receives the system information and the RACH response message transmitted by the ENB, and which transmits the preamble selected from the specific preamble group and the combined message to the ENB with TTI bundling, wherein the specific preamble group comprises at least one preamble indicating that the user equipment transmits the combined message generated by applying the TTI bundling.

14. The RACH information processing apparatus of claim 13, wherein the ENB comprises:

a preamble group analyzer that analyzes the preamble received from the user equipment to determine whether the preamble belongs to the specific preamble group;

a scheduler/resource allocator that allocates a resource for TTI bundling, when the preamble belongs to the specific preamble group;

a message generator/analyzer that processes the combined message; and a transceiver that transmits the system information and the RACH response message containing resource allocation information to the user equipment, and which receives the preamble and the combined message transmitted by the user equipment.

15. The RACH information processing apparatus of claim 14, wherein the measurement unit determines the following equation:

$$PATHLOSS > PCMAX - preambleInitialReceivedTargetPower - deltaPreambleMsg3 - channel\ offset$$

where PCMAX is a smallest value of a maximum user equipment transmission power and a maximum available transmission power within a cell, preambleInitialReceivedTargetPower is an open loop power control compensation value, and deltaPreambleMsg3 is a compensation value of a preamble format to be used, and the PCMAX, preambleInitialReceivedTargetPower, and deltaPreambleMsg3 are broadcasted in the system information.

16. The RACH information processing apparatus of claim 15, wherein the combined message comprises a Radio Resource Control Connection Request (RRC Connection REQ) message and a Non Access Stratum Service Request (NAS Service REQ) message.

17. The RACH information processing apparatus of claim 16, wherein the message generator/analyzer separates the RRC Connection REQ message and the NAS Service REQ message from the combined message and transfers the NAS Service REQ message to a Mobility Management Entity (MME).

\* \* \* \* \*